Patented Jan. 28, 1941

2,229,684

UNITED STATES PATENT OFFICE 2,229,684

PREPARATION OF VITAMIN B CONCENTRATE

George C. Supplee, George E. Flanigan, and Raymond C. Bender, Bainbridge, N. Y., assignors to The Borden Company, New York, N. Y., a corporation of New Jersey No Drawing. Application May 3, 1935, Serial No. 19,656

5 Claims. (Cl. 167—81)

This invention relates to the preparation of a vitamin B concentrate from cereal products and to the use of the same in preparing milk products and other food products containing a high concentration of vitamin B. Vitamin B concentrates have been obtained from rice polish by various extraction procedures, which procedures frequently include supplementary treatment of the intermediate products. Such procedures, however, have the disadvantages of either extracting substantial proportions of undesirable constituents, for instance, materials which are unpalatable in milk products or materials which accelerate deterioration, or of requiring complicated procedures for the separation of such undesirable materials.

It is an object of the present invention to provide an improved process for preparing vitamin B concentrates from cereal products. A further object is to provide a process for the treatment of the filtrate from an extraction of the cereal product in such a manner as to reduce the undesirable materials to a minimum. A further object is to provide a new vitamin B concentrate of improved keeping quality and palatability and particularly adapted for use in reinforcing foods; for example, in reinforcing normal or evaporated or dried milk for infants' food. It is also an object to provide a method for preparing a milk product of high vitamin B concentration and suitable for infant feeding. Other objects will become apparent.

In describing the invention, reference will be made to the preparation of the vitamin concentrate from rice polish or rice polishings, i. e., the fines from the polishing of rice, and including the bran and germ of the rice kernel (but generally not including the husks), although it is not intended to restrict the invention to treatment of this particular product, since it may also be used with other cereal products containing relatively high percentages of vitamin B, such, for example, as wheat, barley, oats, etc.

We have found that by mixing appropriate quantities of dry crude rice polish with water at a relatively low temperature, for example, at about 40 to 45° F., and agitating the mixture by mechanical means, the cold aqueous solution can be separated from the mass of inert material in a manner such that the objectionable lipid material as well as many of the other extraneous substances remain in the residue and are not present to an obectionable degree in the aqueous extract. This objective and the product of suitable quality and characteristics can be obtained by proper maintenance of temperature, adequate agitation and efficient physical removal of inert and insoluble material, without resorting to the use of expensive solvents or complicated chemical processes.

Furthermore, if in the routine application of our process there does not result, due to lack of proper attention to details, a product of suitable characteristics as will be disclosed hereinafter, we can subject the extract or aqueous portion containing a relatively high amount of vitamin B, to a further physical treatment for the purpose of improving the character of the product.

This further refinement is accomplished by heating the filtrate or aqueous portion obtained from the extraction of the rice polish at low temperature as previously described, to a temperature sufficiently high to flocculate inert material therein. Temperatures from 158° F. up to the boiling point have been found practicable, although in most cases it is not necessary to go as high as the boiling point to effect the separation. At the same time, or previous to or following this heating, the hydrogen ion concentration of the solution is preferably adjusted to about 5.6. By such heating and adjustment of the hydrogen ion concentration, any excess lipid matter or lipid-protein complex is precipitated and flocculated to a degree which permits ready and rapid removal by simple filtration. This treatment and elimination of the lipid material can be carried out without reduction in vitamin B potency of the extract. The elimination of such materials from vitamin B extract, and particularly those prepared from cereal sources, such as rice polish or wheat bran, is a most desirable accomplishment, primarily for the reason that such lipid or fatty material appears to be the principal substance responsible for deterioration of the product and the characteristic unpalatable character of such material.

As a specific example of the working of our process, about 4 parts by weight of water is added to one part by weight of crude commercial rice polish in a suitable mixing vat. The water should be added and maintained at a relatively low temperature but above the freezing point of the water. For practical reasons, it is preferred to operate at a temperature of about 40 to 45° F. However, temperatures as high as 56 or 58° F., or even higher, may be used, although greater difficulty is experienced in proper filtration if the temperature of the water is increased.

The mixture of rice polish and cold water is agitated thoroughly for a period of about 4 hours, during which time the temperature is maintained within the selected limits. The degree of agitation should be such that even the coarsest suspended particles will be in motion. At the end of the 4 hour extraction period, there may be added from about 10 to 20% by weight (on the basis of the original dry rice polish) of Filter-Cel or other filter aid, such as is used in many filtration processes, for example, diatomaceous earth. The filter aid is thoroughly mixed with the mass and the total mixture is drawn or pumped to a filter press capable of withstanding as high as 100 pounds pressure. In practice, the following details have proved successful: One ton of rice polish and 4 tons of cold water have been mixed as specified. At the end of the mixing period, from 200 to 400 pounds of filter aid have been added. The mixture is drawn through a filter press, the size and number of plates of which may vary, the particular type of press being not pertinent to the present invention. However, the filter cloths known as "chain" cloths or "twill" cloths have been found satisfactory. The material pumped to the press is first applied with low pressure and as the segments of the filter plates fill, the pressure is slowly increased up to as high as 60 or even 100 pounds, or higher, pressure. Rice polish of average character, in so far as percentage of various sized particles is concerned will require an amount of Filter-Cel within the limits specified. The exact amount, however, cannot be predicted for each lot of polish, because the percentage of various sized particles of material will vary somewhat. During the first few minutes of operation of the press, the filtrate is cloudy, showing evidence of ineffective removal of extraneous material. Experience has shown that such initial filtrate is relatively high in the lipid-protein complex which it is desired to remove. Recirculation or refiltration of this first cloudy filtrate is therefore advisable. This undesirable filtrate usually contains from about 5, to as high as 7½ and 8%, of solid matter. A satisfactory filtrate, in so far as vitamin potency and freedom from extraneous matter of lipid character is concerned, results when the percentage of solid matter in the filtrate is reduced to not in excess of about 3 to 3½%. Proper operation of the filter press and application of pressure in so far as the rate of filling the press is concerned, will give a filtrate containing not in excess of about 3% solids after a few minutes operation.

The filtrate of proper solids content shows no turbidity or substantially none. The lipid character or fatty content of the solids of such a filtrate will be less than about 1%, on the basis of total solids, and in a properly prepared extract or filtrate, this will vary from about .4% to .9%.

If, because of the variable character of the crude rice polish or inadvertencies or lack of proper precautions in maintenance of temperature, or improper filtration, the resulting filtrate has an excess of total solids and lipid content, such filtrate may be transferred to a suitable vat or other container and heated to a temperature sufficiently high to effect flocculation of extraneous matter, for example, to about 150° F. to 212° F., and preferably to between 160 and 180° F., its pH value being adjusted either before or during or after the heating to a value of about 5.5 to 5.6. The exact temperature to be selected for this step will vary with varying materials, inherent salt concentrations and possibly other factors aside from the adjustment of the pH value to the proper point. The pH range during this step may vary from about 5.2 to 5.8. However, the most satisfactory results, in so far as flocculation of the lipid-protein complex is concerned, occur in the presence of heat at about the isoelectric point of the lipid-protein complex, this being, in the example given, within a pH range of about 5.5 to 5.6.

The pH value may be regulated to the value described above, by adding non-toxic acids, such as acetic or lactic acid or, preferably, hydrochloric acid.

The material precipitated by the heat and pH adjustment just described may be readily filtered without extraordinary precautions. This may be accomplished with an ordinary filter press and even without admixture of filter aid, or the cleared liquor may be decanted after standing. It is preferred, however, to remove the precipitate while hot.

After preparation of a filtrate of desired characteristics, as obtained by filtration under the conditions specified or by subsequent heating with pH adjustment, followed by separation of any suspended material, the filtrate or extract may be condensed in an ordinary vacuum pan under usual conditions of procedure to any desired degree of consistency. A solids content of as high as 65% has been obtained in this manner. This concentrated material has a viscous, molasses-like consistency. The concentrate in this condition may be stored at low temperatures, for example, at about 0 to —15° F., for as long as a year without substantial deterioration in vitamin content or other desired characteristics. In practice, however, we prefer to concentrate to the consistency mentioned above and to then reduce the material to dryness by appropriate means. The drying may be accomplished by spray drying apparatus commonly used for the spray drying of milk; or the drying may be accomplished in a so-called finishing pan, such as is frequently used in the preparation of malted milk.

The dried material is somewhat hydroscopic, is of good and acceptable palatability, of high vitamin B potency, and of good keeping quality, in that evidence of fatty or lipid deterioration is not manifested after long periods of storage. The dried concentrate thus obtained is soluble in water and in milk.

The following is an analysis of a typical concentrate expressed on the dry basis:

| | Per cent |
|---|---|
| Protein (N x 6.25) | 19.56 |
| Total fatty or lipid matter | 0.41 to 0.94 |
| Phosphorus, expressed as $P_2O_5$ | 5.80 |
| Ash (including phosphorus) | 7.50 |
| Soluble starch | 0.24 to 1.5 |
| Reducing sugar, calculated as dextrose | 23.50 |
| Non-reducing carbohydrate (dextrins, etc., calculated as sucrose) | 23.40 |

The phosphorus content, which in the example given above is about 75% of the total ash, is about twice as great as the percentage of phosphorus (as $P_2O_5$) in a high grade cleaned crude rice polish. In the latter the total ash of a typical sample was found to be about 8.7%, while the $P_2O_5$ content was about 3.35%.

The product prepared according to the process described above has superior keeping qualities as compared with a similar product in which the lipid material is not eliminated. The vitamin B concentrate on the dry basis has been shown by direct bio-assay on numerous occasions to contain from about 18,000 to 22,000 and, in some instances, as high as 25,000 Chase-Sherman vitamin B units per pound, when measured according to the method described in the Journal of the American Chemical Society, vol. 53, page 3506 (1931).

The product obtained by this process is substantially devoid of the lactoflavin component of vitamin G and for that reason is useful as a supplement for basal rations in the assay of vitamin G in other substances.

The water soluble dry product or the concentrate, prepared as described above, may be added to milk whereby the nutritive and growth promoting properties of the milk are materially enhanced. It has also been found that this mixture may be dried and may even be subjected to the high temperatures employed in the drying of milk by the double drum process, commonly known as the Just process (using, for example, an apparatus as described in the Just Patent 712,545), without substantial destruction of the vitamin B potency. In such drying the milk or fluid mixture is subjected to a temperature of about 212° F. for about 2 or 3 minutes before forming the film on the revolving drum and while on the drum the film is progressively subjected to temperatures of about 240 to 256° F. during a period of about 2 to 3 seconds. Furthermore, it has been found that the concentrate or dry product prepared as described above may be added to evaporated milk and the mixture subjected to the usual sterilizing temperatures without significant destruction in potency of the vitamin B so added or of the natural supplementing relationship between the concentrate and the milk components, and without coagulation or separation of the serum or fats of the milk. In the sterilization of evaporated milk, the milk is ordinarily heated for about 15 to 40 minutes to reach a temperature of 220 to 235° F. and is held at this temperature for about 20 to 30 minutes.

In the compounding of our vitamin B extract with milk, distinctly favorable results have been demonstrated when the dry concentrate is added to milk in the proportions of about 3 to 3½ pounds of the vitamin B concentrate (on a dry basis) per 100 pounds of milk solids. The vitamin B potency of milk, fluid, dry, evaporated or condensed, when fortified with vitamin B as described above, shows, in contrast with similar milk not fortified, a vitamin B potency about twice that of the unfortified product.

The water extract from the cereal may be used in different ways depending upon the plant conditions. For example, if it is to be added to the milk in the same plant in which it is extracted, no concentration of it will be necessary. In such operations it may be added directly to the milk and, if the latter is to be evaporated, may be evaporated with the milk. If the extract is to be shipped or stored, it may be concentrated or dried. The dried material is an amorphous dry material which can be stored without deterioration. It should be kept in air tight containers, however, since it is somewhat hygroscopic.

The dried material may be mixed with dry milk or dried milk products and used in the same manner as the normal dried product or it may be put into solution and added to the milk product in that form.

The concentrate prepared as described above is high in soluble phosphorus, which may have a beneficial effect in the preventing of coagulation of the milk during treatment at elevated temperatures, such as are encountered in sterilizing or drying the milk.

The concentrate prepared as described above may be used alone as a food product and is very useful in the reinforcement of foods. For example, it may be used to advantage in reinforcing the food value of milk or milk products for the feeding of infants. Another example of its use is in the fortifying of lactose. It has been found that the use of the material described herein, with or without milk supplementation, results in an increased rate of growth and greater efficiency of food utilization.

In applying the invention to the extraction of vitamin B from other cereal products, variations in temperature and pH value may be desired to give the best results in the extraction and in the separation of lipid-proteins, it being desirable to precipitate these materials at substantially their iso-electric point.

It is apparent that many modifications may be made in the preparation and use of the vitamin B concentrate described herein and it is not intended to limit the invention to the particular embodiments disclosed. The terms used in describing the invention have been used in their descriptive sense and not as terms of limitation and it is intended that all equivalents thereof be included within the scope of the appended claims.

What we claim is:

1. A method for preparing a water soluble extract high in vitamin B, comprising extracting cereal containing vitamin B with water, filtering the extract, adjusting the pH of the extract to substantially the iso-electric point of the lipid-proteins in the filtrate, heating the filtrate to above about 158° F. and separating the precipitate.

2. A method as described in claim 1 in which rice polishings are extracted at a temperature of about 40 to 58° F. and the filtrate is adjusted to a pH of 5.2 to 5.8 and heated to about 158° F. to 212° F.

3. A method as described in claim 1 in which the extraction is conducted at about 40 to 45° F. and the filtrate is heated while at a pH of about 5.5 to 5.6.

4. A method as defined in claim 1 in which the filtrate is evaporated to dryness.

5. A method of preparing a water-soluble extract high in vitamin B, comprising extracting rice polish with water, separating the extract from the rice polish, adjusting the pH of the extract to about 5.5 to 5.6, heating the extract to flocculate the precipitated matter, separating the precipitate from the extract and evaporating the extract.

GEORGE C. SUPPLEE.
GEORGE E. FLANIGAN.
RAYMOND C. BENDER.